3,002,900
PREPARATION OF PLATES FOR DEFERRED ACTION TYPE BATTERIES

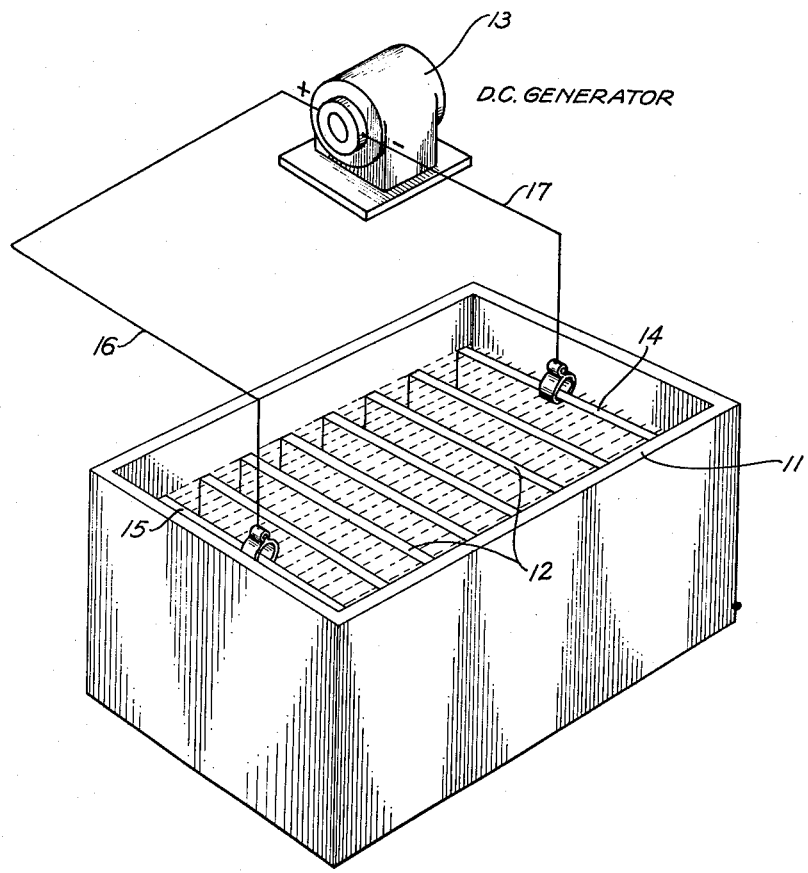

James W. Henry, Kingsport, Tenn., and Linwood P. Morrison, Rochester, N.Y., assignors, by mesne assignments, to the United States of America, as represented by the Secretary of the Navy Filed Oct. 7, 1949, Ser. No. 120,053
2 Claims. (Cl. 204—42)

This invention relates to small, high voltage batteries of the deferred action type in which electrolyte is not applied to the plates until it is desired to form the cells of the battery. More particularly, the invention relates to improvements in processes of depositing electrode materials on metal sheets from which the battery plates are blanked.

It has been recognized for some time that a deferred action type of battery utilizing an acid electrochemical system rather than the alkaline system heretofore used most extensively would make practicable the manufacture of small, high voltage batteries having a watt-second capacity greatly in excess of batteries using an alkaline electrolyte. The use of an acid system has not been feasible until recently because of the need of intercell communication through leveling holes in the battery plates to assure even distribution of the electrolyte to all parts of the battery. The column of electrolyte in the aligned leveling holes caused "local short circuits" which decreased the life of the cells by wastefully depleting the supply of electrolyte available to enter into electrochemical reaction, and necessitated the use of an alkaline electrolyte which, because of its relatively high resistance, reduced the effect of this "short circuiting" of the cells. Recently several means of equalizing the filling of the cells have been devised which make possible the use of an acid electrochemical system without the danger of rapid discharge due to short circuiting of the cells.

The advantages of an acid electrolyte system, which would be capable of sustaining much greater electrical loads per unit volume than alkaline systems, are well known, and deferred action type batteries utilizing an acid electrochemical system have been successfully manufactured. However, the processes heretofore used for depositing the electrode materials on the battery plates made the electropositive coatings sensitive to moisture with the result that the batteries exhibited extremely poor operating characteristics after storage for long periods in humid atmospheres.

This invention particularly relates to the use of the perchlorate salts of lead as a solution to simultaneously plate lead and lead dioxide on opposite sides of conducting sheets from which the battery plates are fabricated. The advantages of this electrolyte are well known. With an appropriate material for the conducting sheets, the amount of lead dioxide electrode material formed at the anode is almost equal to the amount of lead deposited at the cathode. The near equality of the anodic and cathodic deposits makes possible a plating arrangement in which lead is deposited on one side of a conducting sheet and the peroxide of lead on the other. If a number of conducting sheets are arranged in series in a bath of lead perchlorate in a nonconducting tank, and voltage is applied to the end sheets, each sheet acts as an anode on one side and a cathode on the other. Electrolytic cells are thus formed between adjacent conducting sheets with each conducting sheet acting as means for connecting cells. This system greatly facilitates the mass production of battery plates for deferred action type batteries.

Even with this ingenious and economical method of depositing the coatings on the conducting sheets, the manufacturing processes heretofore used have been exacting, troublesome, and inappropriate for mass production. The nonconducting tanks heretofore used to contain the lead perchlorate bath had to be formed with sheet locating grooves along the inner surface of the side and bottom walls thereof to seal between the conducting sheets and the walls of the tank to prevent intercell leakage of electrolyte during the plating process. Intercell communication of electrolyte resulted in dissolving the lead dioxide as it plated out at the anode. The thin conducting sheets tended to buckle and form wavy edges when sheared, resulting in difficulty in fitting the sheets in the grooves of the nonconducting tank, and the resulting poor seal between the edges of the conducting sheets and the tanks permitted sufficient current leakage between the cells to dissolve the lead dioxide as it is plated out at the anode and to cause the nickel coating on the conducting sheets to tend to go into solution. Furthermore, it was necessary to provide separate tanks for each thickness of conducting sheet that it was desired to coat with electrode material.

Considerable difficulty has also been heretofore encountered in obtaining satisfactory deposits of lead and lead dioxide on the conducting sheets, and it is necessary to apply a passive subcoating of nickel to the conducting sheets to obtain good adherence of the electrode coatings. However, there is a tendency for the metal of the conducting sheets to erode under anodization, resulting in the pitting of the lead dioxide and nickel platings and exposure of the iron in the metal of the conducting sheets to oxidation. This corrosion of the iron in the base metal of the battery plates proceeds most rapidly when the batteries are stored under the high humidity conditions of tropical climates, and the poor performance of deferred action type batteries after storage for long periods in humid atmospheres caused many to look upon such batteries with disfavor. When thick deposits of nickel were utilized in an attempt to increase the shelf life of the batteries, considerable difficulty was encountered in blanking the thickly plated sheets, and it was found that the thick nickel plating prevented satisfactory adherence of the lead dioxide.

It is an object of this invention to provide an improved method of preparing plates for deferred action type batteries which makes possible the most economical deposition of electrode material and greatly facilitates the mass production of the conducting sheets from which the battery plates are blanked.

It is a further object of the invention to provide an improved process of electrolytically depositing lead and lead dioxide on opposite sides of conducting sheets arranged in series in a bath of lead perchlorate which will obviate the necessity of completely sealing off the electrolyte between cells and still yield excellent adherence of the lead and lead dioxide coatings to the conducting sheets.

It is also an object of the invention to provide an improved method of preparing lead and lead dioxide coated sheets from which the plates of a deferred action type battery are blanked which will require only a minimum of nickel plating and still provide maximum shelf life and resistance to corrosion under humid storage conditions.

In accomplishing the objects of the invention, excellent adherence of the lead and lead dioxide deposits without sealing the conducting sheet to the walls of the tank is made possible by raising the electromotive force applied to the end sheets of the series of conducting sheets to compensate for losses introduced by intercell leakage of current. The maximum resistance to corrosion under humid storage conditions with only a minimum of nickel plating on the conducting sheets is obtained by utilizing a noncorrosive iron alloy for the metal of the conducting sheets.

Other objects and advantages of the invention will be apparent from the following detailed description when read in connection with FIG. 1 of the drawing which illustrates in perspective an arrangement of conducting sheets in an electrolytic bath used in carrying out the improved process of the invention. A nonconducting tank 11 conveniently constructed of glass or a suitable plastic material not affected by perchloric acid, such as a thermoplastic acrylic polymer resin sold commercially under the trade name "Plexiglas," is filled with a bath of approximately 420 grams of litharge (lead monoxide) and 320 cubic centimeters of perchloric acid per liter of water. A plurality of conducting sheets 12, from which battery plates will be blanked after the lead and lead dioxide electrode materials have been deposited thereon, are positioned in spaced relation between the side walls approximately parallel to the end walls of the tank 11.

To prevent the lead dioxide from dissolving as it is plated out at the anode, it has hitherto been necessary to seal the conducting sheets to the walls of the tank to prevent intercell leakage of electrolyte. To accomplish the sealing, sheet locating grooves were heretofore provided in the inner surfaces of the bottom and side walls of the tank to provide snug fits between the conducting sheets 12 and the walls of the tank. It was convenient to mold a tank with grooved bottom and side walls from a suitable thermoplastic acrylic polymer resin which would not be affected by the perchloric acid. However, it was found to be exceedingly troublesome and tedious to seal the conducting sheets to the walls of the tank. A wavy edge was often formed on the thin conducting sheet 11 during the operation of shearing the sheets which prevented an effective seal between the sheets 12 and the walls of the tank 11. Difficulty in obtaining good adherence of the electrode deposits was encountered if the sheet locating grooves were greater than approximately .005 inch wider than the thickness of the sheets 11, and it was eventually found necessary to line the grooves of the tank 11 with stainless steel guides (not shown) to allow metal-to-metal contact for inserting the sheets in the grooves and to reduce intercell leakage of current.

We have discovered that the lead and lead dioxide electrode materials can be deposited with excellent adherence to the conducting sheets 12 without sealing the conducting sheets 12 to the walls of the tank 11. As shown in FIG. 1, voltage is applied from the direct current generator 13 to the end sheets 14 and 15 of the series of conducting sheets 12 by means of leads 16 and 17. Each conducting sheet 12 acts as a cathode on one side and an anode on the other to form a single cell between adjacent plates with the metal of the conducting sheets 12 acting as means of connecting the cells. We have discovered that excellent adherence of the electrode materials can be obtained without sealing the conducting sheets 12 to the walls of the tank 11 by raising the voltage applied to the end sheets 14 and 15 sufficiently to compensate for the losses introduced by intercell leakage of current. At a current density of approximately forty amperes per square foot electrode area, a voltage of approximately three volts per cell will prevent the lead peroxide from dissolving in the electrolyte as it is plated out at the anodes and will yield excellent adherence of the lead dioxide to the conducting sheets without pitting of the electrode material coatings. The exact voltage per cell for optimum deposit of the lead dioxide depends on the amount of intercell communication of electrolyte and must be adjusted for each tank. Moderately high or low current densities have a destructive effect and result in pitting of the lead dioxide coating. At voltages per cell too low to compensate for the losses introduced by the intercell leakage of current, the lead dioxide dissolves as it is plated out at the anode and the nickel subcoating on the conducting sheets tends to go into solution. If too high voltage per cell is utilized, the resulting high current density tends to pit the conducting sheet 12 through the nickel plating and to produce a hard, brittle lead dioxide deposit which has the appearance of a baked japan lacquer. When a voltage per cell sufficient to compensate for the losses introduced by the intercell leakage of current is utilized, optimum deposits of the electrode materials are obtained which adhere readily to the conducting sheets and exhibit no pitholes in the surface of the lead dioxide. With intercell communication of electrolyte a narrow strip approximately ¼ inch in width around the perimeter of the conducting sheets is not plated with the electrode materials, but the remainder of each sheet is covered with coatings of excellent quality. This unplated area is negligible when large conducting sheets 12 are coated or if a continuous strip process for producing the sheets is utilized.

It has also been discovered that the concentration of the hydrogen ions (pH) must be maintained between 3.5 and 5.1 to produce satisfactory deposits of lead and lead dioxide. Dropping of the pH below 3 results in a poor lead dioxide deposit full of pitholes and streaks. The pH changes as the plating process continues, resulting in a strata effect due to removal of the lead from the plating solution at the anode at a faster rate than renewal of the lead to the solution can take place by normal diffusion of the lead salts through the solution. The high concentration of acid at the cathode prevents the deposition of a high quality coating of lead dioxide unless the electrolyte is thoroughly agitated. Circulation of electrolyte by means of a pump eliminates the effects of pH stratification. The lead content of the lead perchlorate solution may be kept constant by controlling the pH by the addition of perchloric acid when the pH is to be lowered and by the addition of lead monoxide (PbO) when the pH is to be raised.

Deferred action type batteries heretofore manufactured which utilized lead dioxide anodes were found to be impractical in that the lead dioxide coating was sensitive to moisture with the result that the performance of the batteries was extremely poor after storage for long periods in humid climates. Our experiments have shown that the poor performance was caused by oxidation of the iron in the metal from which the battery plates were blanked. There is a definite tendency for the base metal of the conducting sheets to erode under anodization resulting in pitting of the lead dioxide and nickel plating and exposure of the iron in the base metal to oxidation.

A passive nickel subcoating on the conducting sheets 12 is necessary to obtain satisfactory adherence of the lead and lead dioxide coatings. A galvanic action occurs between deposited lead and the iron in the metal of the conducting sheets 12 in the presence of the plating electrolyte which results in erosion of the iron and subsequent peeling off of the electrode material. Examination of the electromotive series will reveal that when nickel is interposed between the iron of the conducting sheets and the deposited lead, the galvanic action will be reduced, and with a nickel subcoating on the conducting sheets good adherence of the electrode materials can be obtained.

Results of our experiments revealed that deposition of lead and lead dioxide on a noncorrosive metal conducting sheet is highly desirable. However, if a thick subcoating of nickel is relied upon to prevent corrosion of the corrodible iron alloy conducting sheets 12, it is extremely difficult to blank the sheets, and only poor adherence of the lead dioxide deposit can be obtained. We have discovered that the use of a suitable noncorrosive iron alloy for the conducting sheets greatly increases the shelf life of the battery plates under humid conditions when compared with plates blanked from conducting plates of sheet steel, even if the thickness of the nickel subcoating on the noncorrosive sheet is only a fraction of the thickness of the nickel plating on the sheet steel. Any of the noncorrosive nickel-chromium-iron (stainless steel) alloys, the chromium-iron (rustless iron) alloys, or the nickel-iron alloys provide excellent adherence of the electrode material and greatly increase shelf life, the most satisfactory being AISI type No. 430 (17% chromium, 83% iron) rustless iron. The poor performance of deferred action batteries formerly manufactured with lead dioxide anodes was due to oxidation of the iron in the battery plates at the points where pitholes had been formed in the lead dioxide and nickel coatings during anodization. The electrode materials will not adhere to the noncorrosive iron alloy without a subcoating of nickel because of galvanic action between iron and lead. However, it has been discovered that a considerably thinner subcoating of nickel is required on the noncorrosive iron alloys than on sheet steel to obtain equal adherence of the electrode deposits. Even when copper is plated over the corrodible iron alloys before the nickel subcoating is applied, it has been found that considerably less nickel plating is required to obtain equal deposits of the electrode materials on the noncorrosive alloys. While plating of from .0003 to .0004 inch of nickel is required with corrodible iron alloy conducting sheets to obtain good adherence of the lead dioxide, only a flash of nickel plating from .000005 to .00005 inch in thickness is required to obtain deposits of lead dioxide of equal quality on sheets of noncorrosive iron alloy. The noncorrosive alloy is relatively insoluble in and unaffected by the lead perchlorate electrolyte plating solution in comparison to sheet steel and requires only a minimum plating of nickel to obtain optimum deposits of the electrode materials without pitting of the lead dioxide. Even with this minimum subcoating the battery plates blanked from noncorrosive iron alloys have a much greater shelf life under humid conditions than similar plates blanked from coated corrodible iron alloy conducting sheets. When subjected to an atmosphere of 95 percent relative humidity at a temperature of 120° F. for thirty days the battery plates blanked from noncorrosive iron alloy with only a nickel flash show no deterioration, while similar coated battery plates blanked from sheet steel with a thick subcoating of nickel are badly corroded.

The use of noncorrosive iron alloy conducting sheets makes possible the electrodeposition of lead dioxide over a much wider range of current densities than is possible with corrodible iron alloy conducting sheets.

While the embodiment of the present invention as herein described constitutes a preferred form, it is to be understood that other forms might be adopted all coming within the scope of the claims which follow.

We claim:

1. The process of preparing battery plates by depositing lead and lead dioxide electrolytically on opposite sides of conducting plates from a lead perchlorate bath consisting of approximately 420 grams of lead monoxide and approximately 320 cubic centimeters of perchloric acid per liter of water, characterized by placing the bath in a nonconducting container, inserting a plurality of such plates approximately parallel in the bath and in series forming separate cells between successive plates but without completely sealing off the electrolyte between cells, and applying across the series a voltage of approximately three volts per cell sufficient to deposit the lead and lead dioxide on opposite sides of each plate without simultaneously dissolving the lead peroxide from the anode in spite of the leakage between cells.

2. The process of preparing battery plates by depositing lead and lead dioxide electrolytically on opposite sides of conducting plates from a solution of lead perchlorate in a nonconducting container, characterized by plating between .000005 and .00005 inch of nickel on plates of an iron alloy which is substantially noncorrosive in lead perchlorate, placing a plurality of the nickel coated plates in the solution in series, and applying voltage across the series.

References Cited in the file of this patent

UNITED STATES PATENTS

| | | |
|---|---|---|
| 2,271,209 | Schlotter | Jan. 27, 1942 |
| 2,370,986 | Nachtman | Mar. 6, 1945 |
| 2,567,934 | Green et al. | Sept. 18, 1951 |